(12) United States Patent
Anderson (10) Patent No.: US 8,910,067 B1
(45) Date of Patent: Dec. 9, 2014

(54) INTERACTIVE INFORMATION DISPLAY THROUGH WIDGETS

(75) Inventor: Donna Michelle Anderson, Sherman Oaks, CA (US)

(73) Assignee: The Clic, Inc., Beverly Hills, CA (US)

(*) Notice: Subject to any disclaimer, the term of this patent is extended or adjusted under 35 U.S.C. 154(b) by 627 days.

(21) Appl. No.: 12/228,422

(22) Filed: Aug. 11, 2008

Related U.S. Application Data (60) Provisional application No. 60/964,342, filed on Aug. 10, 2007.

(51) Int. Cl.
*G06F 3/00* (2006.01)
*G06F 9/00* (2006.01)
*G06F 17/00* (2006.01)

(52) U.S. Cl.
USPC ............................ 715/765; 715/744; 715/763

(58) Field of Classification Search
USPC .......... 715/762, 763, 764, 765, 744, 747, 777
See application file for complete search history.

(56) References Cited

U.S. PATENT DOCUMENTS

| | | | | |
|---|---|---|---|---|
| 5,784,067 | A * | 7/1998 | Ryll et al. ...................... | 345/440 |
| 6,484,189 | B1 * | 11/2002 | Gerlach et al. ................ | 715/763 |
| 6,909,439 | B1 * | 6/2005 | Amro et al. .................... | 345/660 |
| 6,910,045 | B2 | 6/2005 | Hickey et al. | |
| 7,031,952 | B1 | 4/2006 | Heumann et al. | |
| 2003/0206195 | A1 * | 11/2003 | Matsa et al. ................... | 345/744 |
| 2005/0172239 | A1 * | 8/2005 | Liu et al. ........................ | 715/763 |
| 2005/0234884 | A1 * | 10/2005 | Drukman et al. ................. | 707/3 |
| 2006/0005207 | A1 * | 1/2006 | Louch et al. ................... | 719/328 |
| 2006/0010394 | A1 * | 1/2006 | Chaudhri et al. ............. | 715/779 |
| 2006/0015846 | A1 * | 1/2006 | Fraleigh et al. ............... | 717/109 |
| 2006/0059429 | A1 * | 3/2006 | Batthish et al. ............... | 715/741 |
| 2006/0265258 | A1 | 11/2006 | Powell et al. | |
| 2007/0038934 | A1 * | 2/2007 | Fellman ........................ | 715/700 |
| 2007/0043766 | A1 * | 2/2007 | Nicholas et al. ............. | 707/104.1 |
| 2007/0118813 | A1 * | 5/2007 | Forstall et al. ................ | 715/805 |
| 2007/0162850 | A1 * | 7/2007 | Adler et al. .................... | 715/700 |

OTHER PUBLICATIONS

Adam Pash, "Start Using the New iGoogle Today", Lifehacker.com, Jun. 30, 2008, http://www.lifehacker.com/397523/start-using-the-new-igoogle-today?mail2=true.

Long, Bridget Terry. "Diversity by Any Other Name: Are There Any Other Viable Alternatives to Affirmative Action in Higher Education?" Western Journal of Black Studies; Spring 2003; 27, 1: Research Library, p. 30.

"ApplyWeb1-11," 11 webpage screenshoots from www.applyweb.com, retrieved from the Internet archive/wayback machine (www.archive.org) on Feb. 3, 2010 and Feb. 12, 2010, dating Dec. 2005-Jul. 2007.

* cited by examiner

*Primary Examiner* — Kieu Vu
*Assistant Examiner* — Anita D Chaudhuri
(74) *Attorney, Agent, or Firm* — Nath, Goldberg & Meyer; Jerald L. Meyer; Stanley N. Protigal (57) ABSTRACT

Displaying information is disclosed. A plurality of widgets is provided within a single interface. At least one widget in the plurality of widgets includes at least one toggle button. The at least one widget is associated with a first set of dimensions. A maximize request is received, through an interaction with the toggle button. A second set of dimensions is determined. At least one widget is displayed in an area defined by the second set of dimensions and within the single interface.

18 Claims, 11 Drawing Sheets

118 ACME University - Profile | Help

Application Process & Requirements

- URL for freshman applicant main page (if app) [acme.edu/admit.html] — 302
- Rolling Admissions? ○Yes ⊙No          Open Admissions? ○Yes ⊙No
- Primary Admission Deadline (mm/dd/yy) [    ] — 304     SAT Required? ○Yes ○No ⊙Not Set
- Binding Early Decision? ○Yes ○No ⊙Not Set      SAT Accepted? ○Yes ○No ⊙Not Set
- Non-Binding Early Action? ○Yes ○No ⊙Not Set   SAT Subject Tests Required? ○Yes ○No ⊙Not Set
- Online Application? ○Yes ○No ⊙Not Set         ACT Required? ○Yes ○No ⊙Not Set
- Common Application? ○Yes ○No ⊙Not Set — 306   ACT Accepted? ○Yes ○No ⊙Not Set
- FAFSA Required? ○Yes ○No ⊙Not Set             Maximum AP Credits accepted? [    ]
- CSS Profile Required? ○Yes ○No ⊙Not Set       Minimum GPA [2.50]
                                                 Minimum SAT Total (CR+Math only) [    ]
- Residency Requirements [Please Select ▼]       Minimum ACT (Composite) [    ]
                                                 Minimum Class Rank [Select A Range ▼]

Admissions Profile — 352

- Number of applicants [2335] — 354              Typical Class Rank of Admittees [Select A Range ▼]
- Number of students offered admission [1581]    Typical GPA of Admittees [    ]
- Number of accepted students attending [497] — 340   Typical SAT Critical Reading of Admittees [500]
- Admission Rate (%) [67.71] — 356               Typical SAT Math of Admittees [    ]
- Student Faculty Ratio [    ] — 358             Typical SAT Total (CR+Math) of Admittees [    ]

ACME University - Match Stats | Help

About Student

Student State of Residence

| Alabama ▼ | Exact Match ▼ | Add/Update | View |

402

Alabama  Exact Match  Delete — 410

404

County

| Please Select ▼ | Doesn't Matter ▼ | Add/Update | View |

406  412

City

| Please Select ▼ | Doesn't Matter ▼ | Add/Update | View |

408

School Level

| College ▼ | 5 ▼ | Add/Update | View |

College  5 — 416  Delete
High School  7 — 414  Delete

Grade/Year

| 11th ▼ | 6 ▼ | Add/Update | View |

11th  6 — 420  Delete
12th  7 — 418  Delete

FIG. 4

GirlEngineer - Profile

My Profile | Help

About You

- UserID: girlengineer — 502
- State: California
- County Not Defined Edit
- City Pomona Edit
- Zip: 90210
- Gender: M O  F ⊙ — 508
- Religion: Please Select Your Religion — 510
- LGBT: Not Applicable
- Birthday: 12/24/1990 — 504
- Email: girl22@example.com
- Password: Change your password
- SchoolName: CabrilloHigh Edit
- School Mascot:
- School Level: High School — 506
- Grade: 12th Edit

About Your Family

- First-Generation American (Parents born and raised outside of US): Yes⊙  No○
- First In Your Family to go to college: Yes⊙  No○
- Colleges attended by your family (for legacy status): Please Select College  View — 512
- Family Member: Please Select A Relation  Add

About Your Academics

- GPA - regular/unweighted: 4.00
- GPA weighted: 0.00
- Academic Interest(s)/Potential Major(s): Please Select Academic Interest  Add  View — 514
- Income Level: $33,000 or less
- Family Members in Household: 4
- Class Position: Valedictorian
- Class Rank: Top 10%

FIG. 5

ACME Tech Match Stats

County of Residence: Riverside County - Exact Match required
Academic Area of Interest: Engineering - Exact Match required
Potential Major: Electrical Engineering (7/7)           602
                 Computer Science (5/7)                  604
                 Physics (4/7)
Typical GPA: 4.0 or higher (5/7)
Grade: 12<sup>th</sup> grade (3/7)

Weight total: 7+5+3=15
A "match" requires 80% of the total score (12/15)

FIG. 6A

Student A
County of Residence: Riverside County
            Exact Match - student proceeds to be processed
Academic Area of Interest: Engineering
            Exact Match - student proceeds to be processed
Potential Major: Environmental Engineering
            Not a Match – 0 points
Student GPA: 4.0
            Match – 5 points
Grade: 12<sup>th</sup> grade
            Match – 3 points Student A total = 8.  Not a Match.

FIG. 6B

Student B
County of Residence: Riverside County
            Exact Match - student proceeds to be processed
Academic Area of Interest: Engineering
            Exact Match - student proceeds to be processed
Potential Major: Electrical Engineering
            Match – 7 points
Student GPA: 4.0
            Match – 5 points
Grade: 11<sup>th</sup> grade
            No Match – 0 points Student B total = 12.  Matched.  (Student receives text message about event.)

ACME University - Reach Out | Help

Splat Metrics

About Student Academics

High School(s) Attended

School State: Alabama — 802

College Applied To: Ivy Green U — 804

Message — 806
- Please Select
- Please Select
- Please visit our CLIC page!
- Please subscribe to our CLIC page for updates!
- Do you have any questions for us? "CLIC Us" on our CLIC page!
- We think you'll be interested in us - visit our CLIC page today!
- We hope you apply - visit our CLIC page for more information!
- Could be a match - visit our CLIC page ASAP

GPA 3.6 or higher — Add To Criteria — View 3.6 or higher — Delete — Add To Criteria — View Class Position Top 20% — Add To Criteria — View Top 20% — Delete — Add To Criteria — View SAT Total (CRM only)

1100 or higher — Add To Criteria — View 1100 or higher — Delete — Add To Criteria — View ACT Composite (not writing)

Please Select — Add To Criteria — View

ACME University – Home Page | Help

900

College Profile
Edit Profile
Acme University 1000 Anywhere Drive Anytown, Alabama 39096

CLIC thiscollege

Announcements — Add New
o Biology Department Faculty and Students Participate in Research Symposium
Edit  Delete

904

College Calendar
« January » « 2008 »

| s | m | t | w | t | f | s |
|---|---|---|---|---|---|---|
|   |   | 1 | 2 | 3 | 4 | 5 |
| 6 | 7 | 8 | 9 | 10 | 11 | 12 |
| 13 | 14 | 15 | 16 | 17 | 18 | 19 |
| 20 | 21 | 22 | 23 | 24 | 25 | 26 |
| 27 | 28 | 29 | 30 | 31 |   |   |

10:40 PM April 29 2008

Upcoming Events — Add Event

902

* 01/04/08 [College] Acme University - Priority Deadline for Financial Aid Consideration (Fall 2008)

Student Voices — Add New Voice
What will you remember most about your time at Acme University?  Delete
Where are some of the best places to go in the Community?  Delete

CLIC Insider — New CLIC Insider Entry
o CLIC Application Tips
o CLIC Must Dos Before You Graduate
o Notable Alumni

CLIC Tips

00:00          00:00

CLIC SAT Tips #1
Learn how to do it right

CLIC Chat »    Attribute Requests    Match Stats    Splat Metrics

ABC Foundation - Profile

Financial Aid

Do you offer Financial Aid ⊙Yes ○No

If Y, what type(s) do you offer? [Fellowship ▾]   If in hand, Please Describe

Scholarship Amount(s)

Submission From [12/31] mm/dd     Start Time [12:00 AM] hh:min AM/PM

Submission To [12/31] mm/dd     End Time [12:00 AM] hh:min AM/PM

Postmark Deadline ☐     Time zone [Please Select ▾]

Direct URL to financial aid application on your site

Financial Aid Basis

Academics ☑     Arts ☑

Community Service ☑     Leadership ☑

INTERACTIVE INFORMATION DISPLAY THROUGH WIDGETS

CROSS REFERENCE TO OTHER APPLICATIONS

This application claims priority to U.S. Provisional Patent Application No. 60/964,342 entitled COLLEGE NETWORK SITE filed Aug. 10, 2007 which is incorporated herein by reference for all purposes.

BACKGROUND OF THE INVENTION

One way that web and mobile site users interact with applications and information is through the use of widgets/gadgets. Unfortunately, interaction with a widget or gadget is typically limited to the display of information, and the ability to remove the widget, or to minimize it within the space allocated to it on the page. When the widget is minimized, a blank area is typically presented to the user. Further, fully functional interactivity with the widget, such as clicking a hyperlink contained in the widget, causes a new page to be launched and the user taken to the new page. Since users are not allowed to fully operate the widget application within the original UI, they lose navigation speeds by waiting for new pages to open and also by having to navigate back and forth between the pages. Users also lose access to related information afforded by staying on the same site page. Additional bandwidth is consumed by the user by having to operate via multiple pages, which can slow their experience and possibly cost them more money. In addition, at the time a user navigates away from the initial page, the site operator loses a user, and with it the potential for positive traffic flow, search engine relevance, and advertising revenue, etc.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
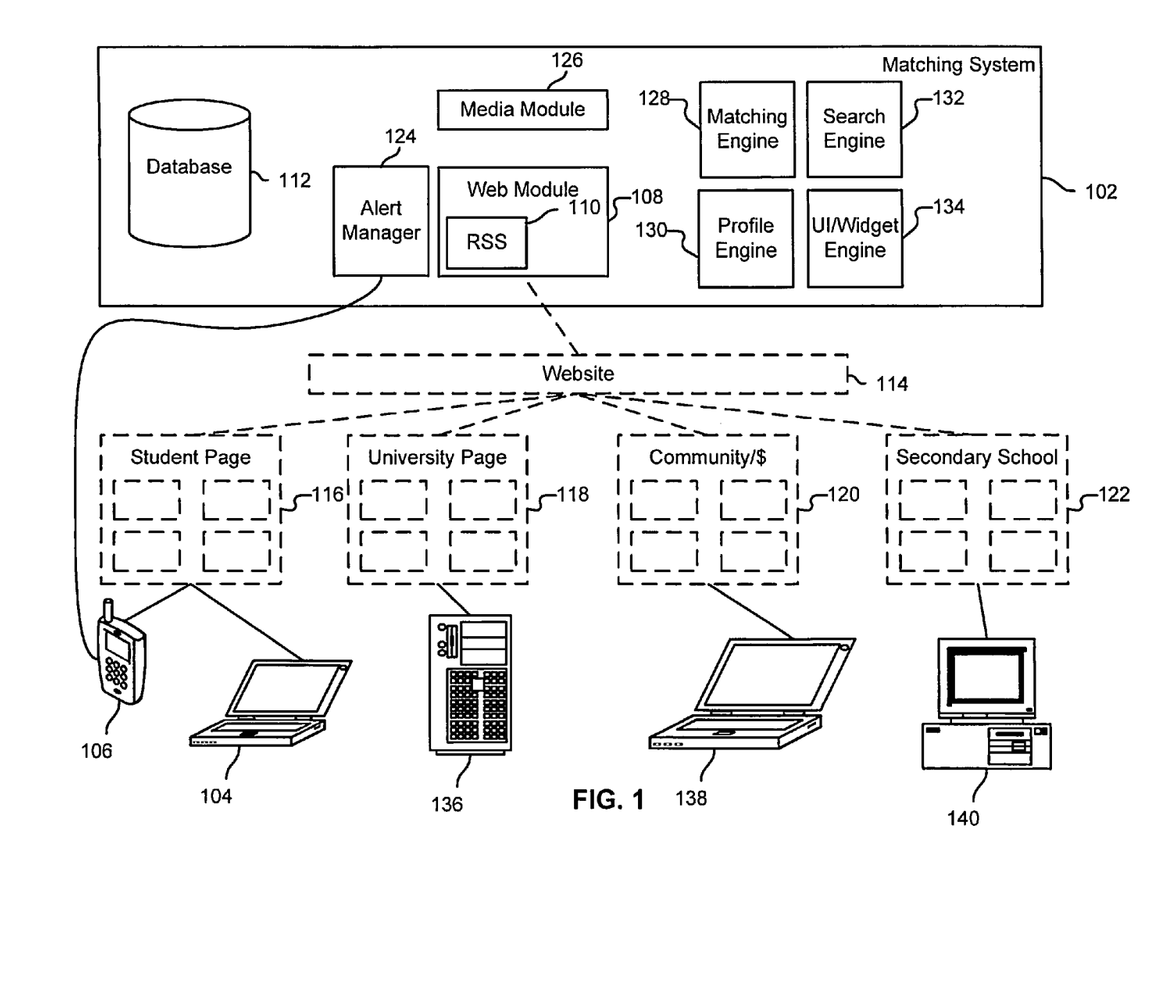
FIG. 1 illustrates an embodiment of an environment for facilitating matches.

FIG. 1 illustrates an embodiment of an environment for facilitating matches. Matching system 102 includes a web module 108 that provides typical web server functionality such as serving a website that provides different types of visitors with different web pages (116-122), capturing user input, and providing Really Simple Syndication (RSS) feed (110) support. In the example shown, web module 108 is an Apache HTTP server that supports running PHP scripts. Web module 108 is interfaced with a database 112, such as through a MySQL database backend.

As described in more detail below, students (e.g. using clients 104 and 106) interact with website 114 through a student portal 116 in a variety of ways, such as by providing and updating profile information (e.g., stored in database 112), performing searches, and receiving a variety of communications and other information from/about different providers. As used herein, the term "providers" refers collectively to universities/colleges (e.g., who access portal 118 using client 136), community groups/financial aid organizations (e.g., who access portal 120 using client 138), and secondary school representatives (e.g., who access portal 122 using client 140). Other entities (not shown) may also interact with system 102, such as parents or other friends/family members of students (who may also have their own portals) and advertisers.

Profile engine 130 is configured to store and retrieve profile data for users of system 102. Search engine 132 is configured to execute searches and provide results. UI/Widget engine 134 is configured to format and display widgets and pages served via website 114. Matching engine 128 compares student profiles and the profiles/requests made by providers. In some embodiments media module 126 is included and is used to serve multimedia content on website 114.

A variety of clients may be used to access system 102, including desktop/notebook computers, mobile telephones, personal digital assistants, and other types of information appliances such as set-top boxes, game consoles, and digital video recorders, as applicable. In some embodiments system 102 includes an alert manager 124 that is configured to send notices to mobile devices, such as client 106, instant messaging clients, and other clients/devices as configured by users of system 102. In some embodiments users subscribe to RSS feeds to receive information such as news updates.

As described in more detail below, database 112 includes calendar information. Providers supply their respective deadlines and other events (e.g. via their respective portals) and students are provided with a filtered view of the calendar information. Provider calendar information is displayed on their respective pages, and a master calendar is provided on a general page for users.

In some embodiments, the infrastructure provided by portions of matching system 102 is located on and/or replicated across a plurality of servers rather than the entirety of matching system 102 being collocated on a single platform. Such may be the case, for example, if the contents of database 112 are vast and/or there are many simultaneous visitors to website 114. In some embodiments portions of system 102 are provided by one or more third parties.

Whenever matching system 102 performs a task (such as receiving information from a user, displaying information to the user, etc.), either a single component or a subset of components or all components of matching system 102 may cooperate to perform the task.

Figure 2:
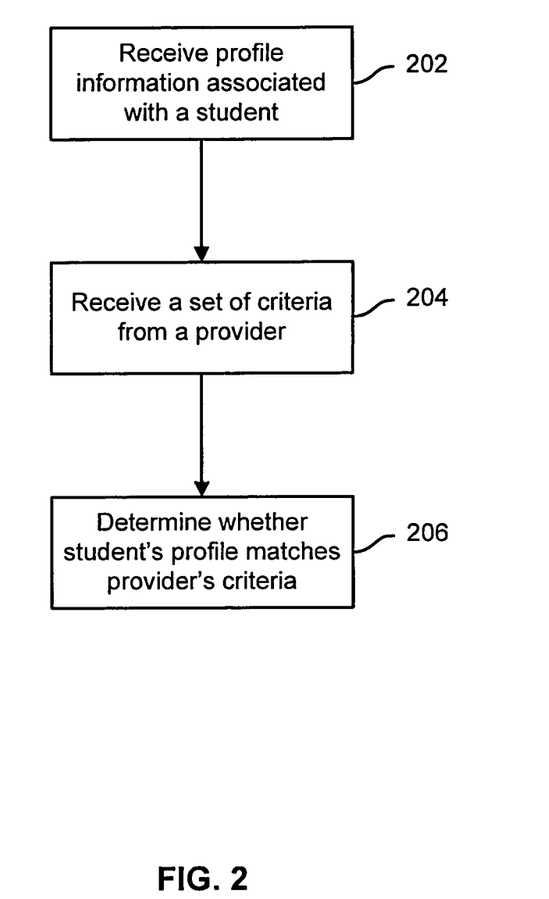
FIG. 2 is a flow chart illustrating an embodiment of a process for facilitating a match between a provider and a student.

FIG. 2 is a flow chart illustrating an embodiment of a process for facilitating a match between a provider and a student. In various embodiments, the process shown in FIG. 2 is performed by system 102. The process begins at 202 when profile information associated with a student is received. As described in more detail below, one example of the processing performed at 202 includes a student creating (or updating) profile information (e.g., by accessing page 116 via client 104). At 204, a set of criteria is received from a provider. As described in more detail below, providers may specify the importance of any particular criterion on a scale (e.g., from 1-10, with 1 being not very important and 10 being important), and may also designate various criteria as mandatory or not applicable. At 206, a determination is made as to whether a particular student's profile information matches the set of criteria provided by the provider. A variety of actions can be taken in response to a match being determined. For example, providers may send messages to students encouraging them to fill out an application form, to contact them for more information, to apply for a particular scholarship, etc.

As used herein, the determination made at 206 can be used to perform both active and passive matches. An active match is a determination that is performed at the request of a user (e.g., a provider). For example, if a college recruiter (e.g., at a liberal arts college) has been tasked with locating volleyball players that are also interested in majoring in English, the recruiter can perform an active match based on those criteria and cause an alert to be sent to students who have indicated that they intend to major in English, that have scored well in English, etc., and have also participated in volleyball. The same recruiter can subsequently actively seek out other specific types of students by providing a new set of criteria. A passive match is a determination that is performed without a specific request from a user. For example, each time a student accesses page 116, the process shown in FIG. 2 is performed based on that student's profile and the profiles of various providers. Matches are automatically shown to the student. This helps the student identify applicable providers (e.g., based on a comparison of the provider's profile and the student's profile).

Figure 3:
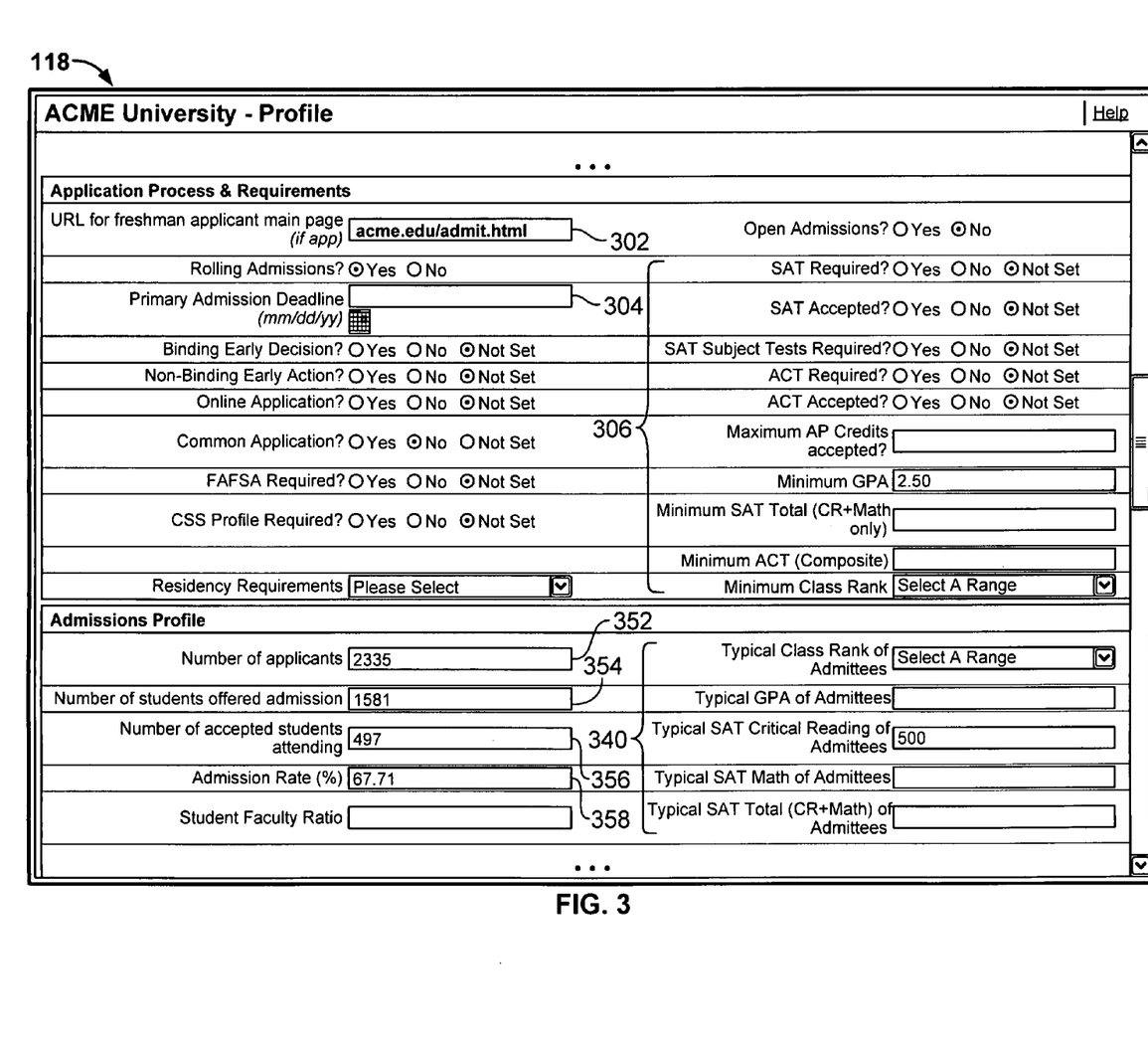
FIG. 3 illustrates an embodiment of an interface to a matching system.

FIG. 3 illustrates an embodiment of an interface to a matching system. The example shown is an implementation of a portion of website 114 as rendered in a browser. A college administrator (employed at ACME University) is logged into site 114. Interface 118 is configured to collect, display, and allow updates to ACME University's profile. The profile documents assorted groups of information about the university. One portion of the profile collects basic details for the University such as the location of the university, its mascot, codes for the university associated with assorted standardized tests and financial programs, whether it is historically associated with a particular demographic (such as by being a "women's college"), the location of its website, whether the university is affiliated with a particular religion, whether the university is a member of a college consortium, and whether it offers an honors program. Another portion of the profile documents the college's application process and requirements, such as the location of its online application (302), application deadline (304), and minimum academic credentials/standardized testing scores (306). Another portion of the profile documents admission and student body statistics, such as the number of applicants (352), the number of applicants offered admission (354), the number of accepted students attending (356), the admission ratio (358), and the typical academic credentials/test scores of admittees (360). The profile also documents the university's three most popular academic programs, sports programs offered by the university, and allows the university to upload or provide links to multimedia content. In various embodiments, different departments of the university (e.g., the medical school, law school, engineering department, etc.) are each permitted to supply their own profiles. In other embodiments, profiles can be configured to include optional sections for such departments.

Figure 4:
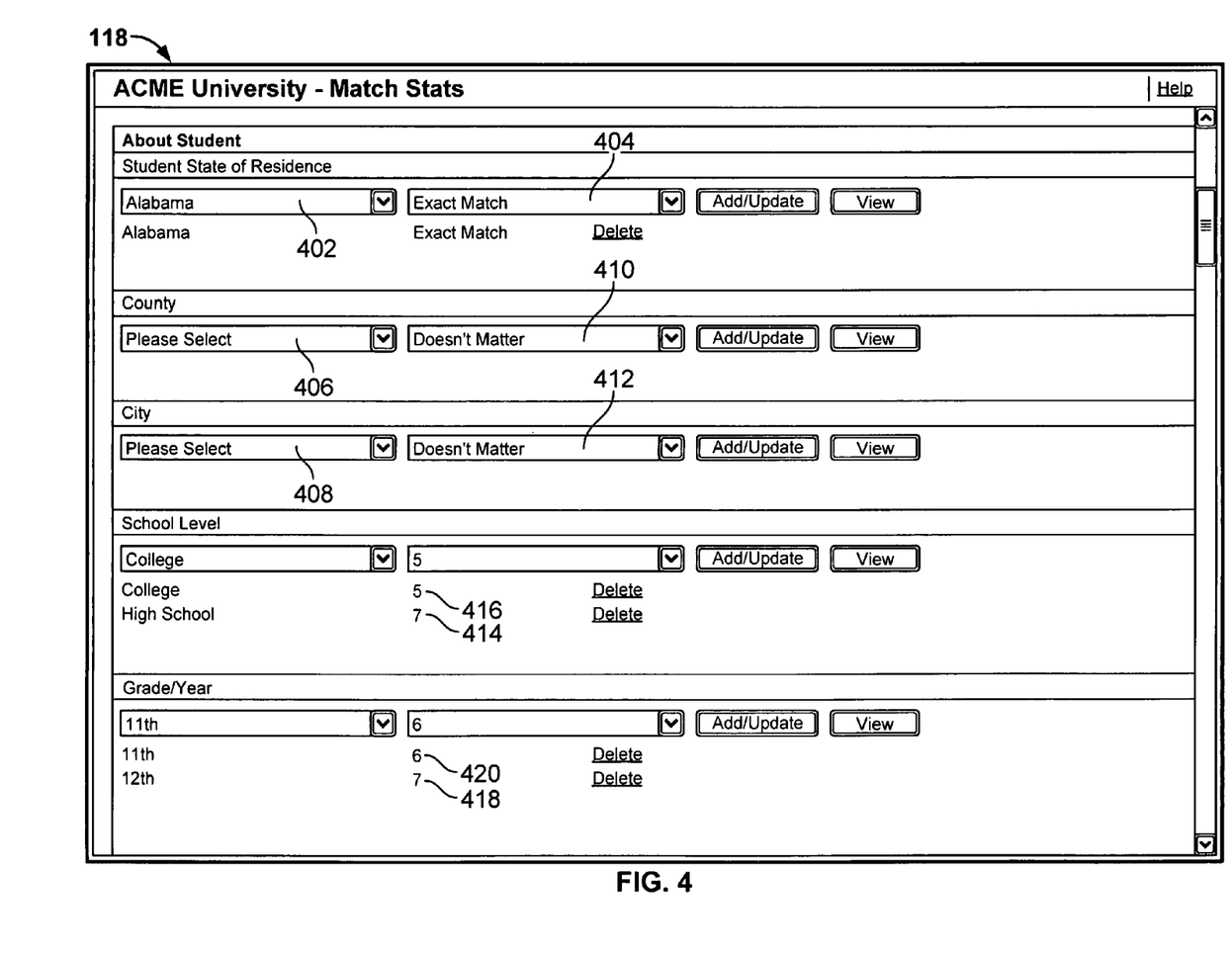
FIG. 4 illustrates an embodiment of an interface to a preference system.

FIG. 4 illustrates an embodiment of an interface to a preference system. The example shown is an implementation of a portion of webs ite 114 as rendered in a browser. The information shown in FIG. 4 is an example of a set of criteria that describe a typical student for which ACME University is likely to be a passive match. Suppose ACME University is an Alabama State school whose mission is to provide a quality education to Alabama residents. The ACME University administrator uses the interface shown to indicate that the school is only interested in reaching out to students from Alabama (402) by specifying that an exact match on that criterion is required (404). ACME University does not care in which county (406) or city (408) the student resides and the administrator selects "doesn't matter" for those criteria, respectively (410, 412). ACME University has a slight preference for recruiting students out of high school over recruiting transfer students from other universities, and has indicated that preference by scoring "high school" as worth 7 points on a 7 point scale (414) and "college student" as worth 5 points out of 7 (416). ACME University has further specified that it is most interested in reaching out to high school seniors (418), but has an almost equal preference for reaching out to junior students so that they have as much time as possible to learn about ACME University has to offer. Additional preferences can also be specified, such as by indicating a preference for students that speak multiple languages, students that are interested in studying math, etc.

Figure 5:
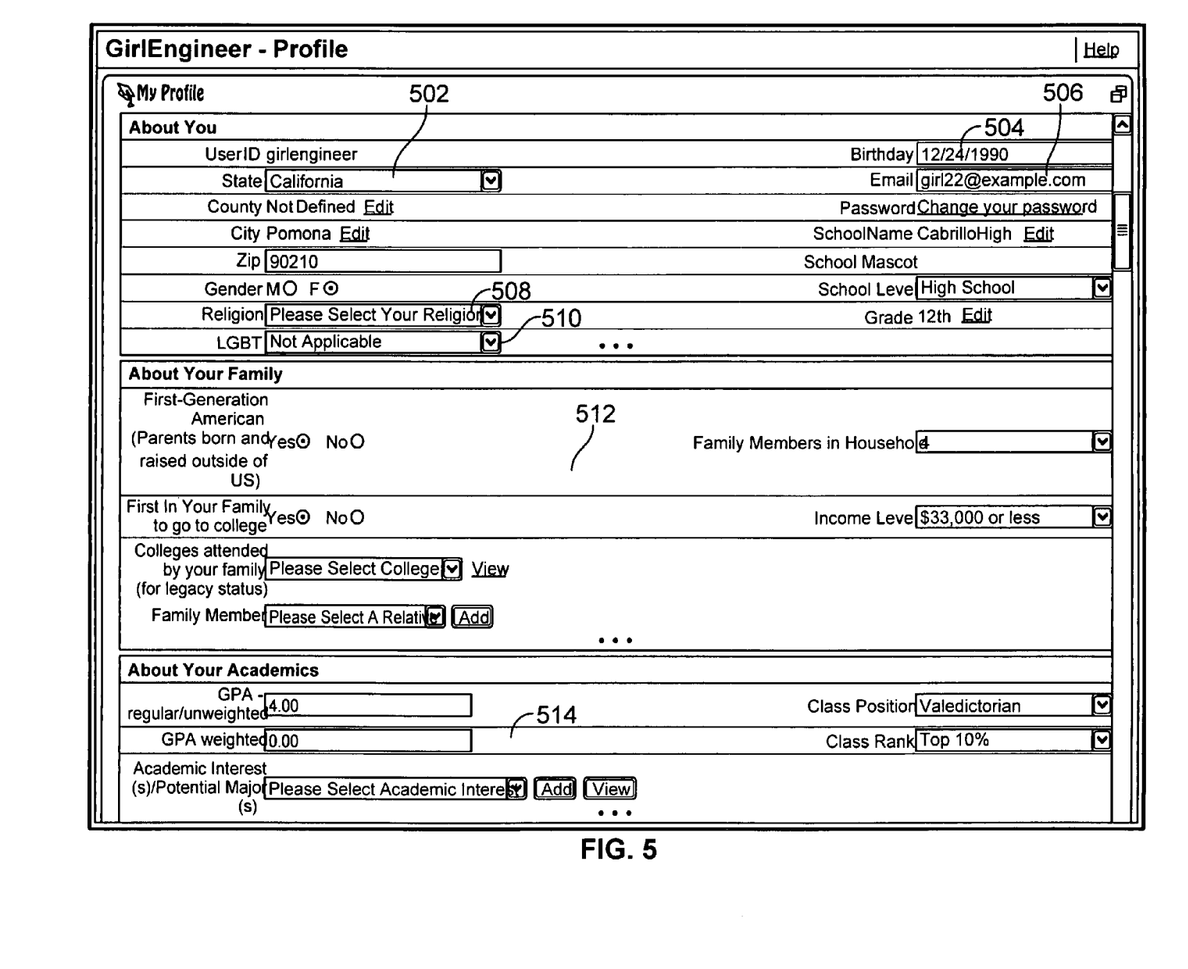
FIG. 5 illustrates an embodiment of an interface to a matching system.

FIG. 5 illustrates an embodiment of an interface to a matching system. The example shown is an implementation of a portion of website 114 as rendered in a browser. A student is logged into site 114 with the username "girlengineer." The student is currently filling out her profile. She can complete it as soon as she signs up for an account on website 114, or can complete/update the profile over time. As described in more detail below, the information in the profile can be used both to help identify colleges/community groups/scholarships for which she would be a good fit via passive matching, and the profile can also be used for active matching by providers who may seek out someone like girlengineer for a specific program/scholarship/etc.

The student has indicated that she lives in California (502), and has provided other basic information about herself such as her birth date (504) and email address (506). If she wishes, the student can also provide more personal information, such as her religion (508), sexual orientation (510), and circumstances such as whether she is a foster child. In various embodiments, providers are not given personally identifiable information when they are matched with a student, but are, as described in more detail below, which may be limited to communicating predefined messages to the student through website 116.

The student can also provide information about her family in region 512 (including information such as her family's household income), information about her academic interests in region 514 (including information such as test scores, graduation date, learning/physical disabilities, whether she would consider a military commitment to help pay for college, whether she currently qualifies for a school lunch program, etc.). In another region, she can describe her accomplishments, such as whether she has studied or visited abroad, her job history, clubs to which she belongs, athletics in which she participates, etc.

Figure 6A:
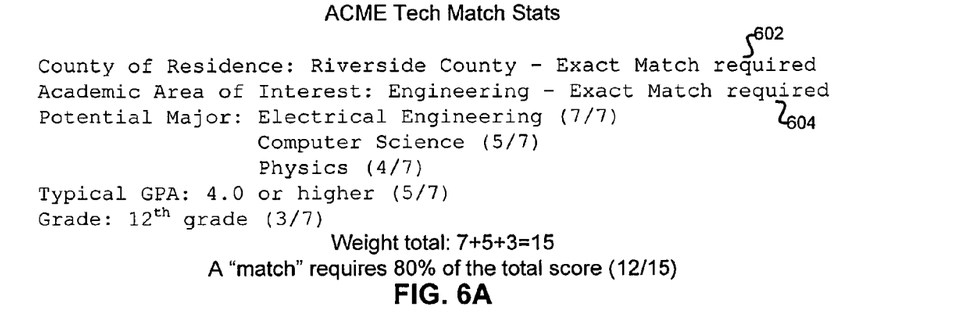
FIG. 6A illustrates an example of a set of criteria.

FIG. 6A illustrates an example of a set of criteria. In various embodiments, the information shown in FIG. 6A is used in the process shown in FIG. 2. In the example shown, a recruiter at ACME Tech plans to visit Riverside County in a month as part of a cross-country recruiting trip. The ACME Tech recruiter would like to alert senior students in Riverside County that are interested in engineering that he will be visiting, and would like to invite them to a recruiting event being held at the Riverside County Library. He has specified, via website 114, that any matching students should receive a message on her personal page on the site and a text message (if the students have opted in to receiving such messages), and has also included the event in the calendar information included in database 112. As a result, any students who match the criteria will have their respective calendars updated to include the recruiting event.

ACME Tech emphasizes electrical engineering, but also has strong computer science and physics programs. Since the event is being held in Riverside County and since ACME Tech is an engineering school, those two criteria require exact matches against student profiles. The strongest preference is for students who would like to major in electrical engineering (7/7) but the recruiter would also be interested in meeting students who intend to major in computer science (5/7) and physics (3/7) with reduced amounts of interest. ACME Tech offers a rigorous academic program and the recruiter prefers to speak with students who have a very high grade point average. Finally, while the recruiter would prefer to speak with high school seniors, he would also be willing to speak to students at other grade levels as well, as indicated by his having assigned a weight of 3/7 to "grade."

After the recruiter has specified his criteria, he can request that an active match be performed against student profile information stored in database 112. In some embodiments a match is determined to occur if the student's profile includes at least 80% of the desired criteria. For example, in addition to the mandatory criteria (602, 604), the ideal student would be interested in electrical engineering (7 points), have a GPA of 4.0 or higher (5 points) and be a senior (3 points), for a total of 15 points. As described in more detail below, a slightly less ideal student (e.g., one interested in computer science, but with a high GPA) might still "match" the supplied criteria, while a student with a lower GPA will not.

Figure 6B:
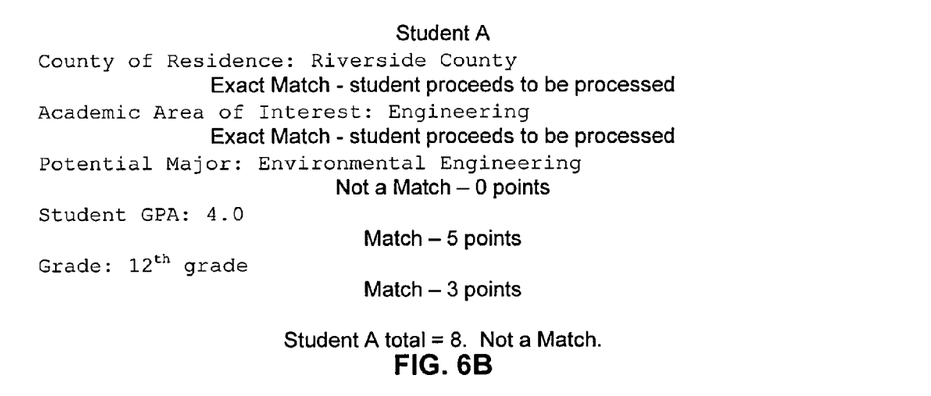
FIG. 6B illustrates an example of a result of performing a match determination.

FIG. 6B illustrates an example of a result of performing a match determination. In the example shown, the profile of a first student, "Student A," is compared against the criteria specified by the recruiter (provider) in FIG. 6A. Student A resides in Riverside County and is interested in engineering. Student A intends to major in environmental engineering (0 points), has a GPA of 4.0 (5 points), and is a senior (3 points). Student A's total score is 8 points, which is less than the 12 points required for a match to be determined.

Figure 6C:
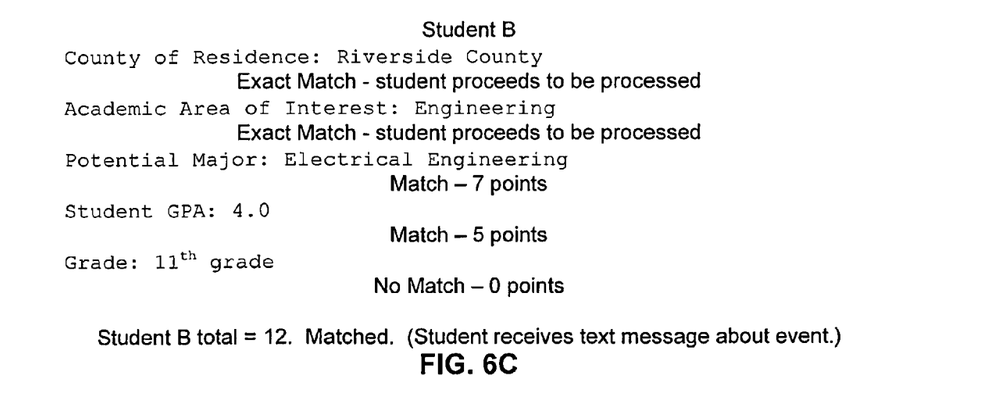
FIG. 6C illustrates an example of a result of performing a match determination.

FIG. 6C illustrates an example of a result of performing a match determination. In the example shown, the profile of a second student, "Student B," is compared against the criteria specified by the recruiter in FIG. 6A. Student B resides in Riverside County and is interested in engineering. Student B intends to major in electrical engineering (7 points), has a GPA of 4.0 (5 points), and is a junior (0 points). Student B's total score is 12 points, which meets the threshold for determining a match between Student B's profile and the set of criteria. In the example shown, Student B will receive a message on her personal home page on the site and a text message on her phone alerting her to the event. Additionally, the next time Student B visits website 114, the event will be included in her calendar, along with details such as the location and time of the event.

Figure 7:
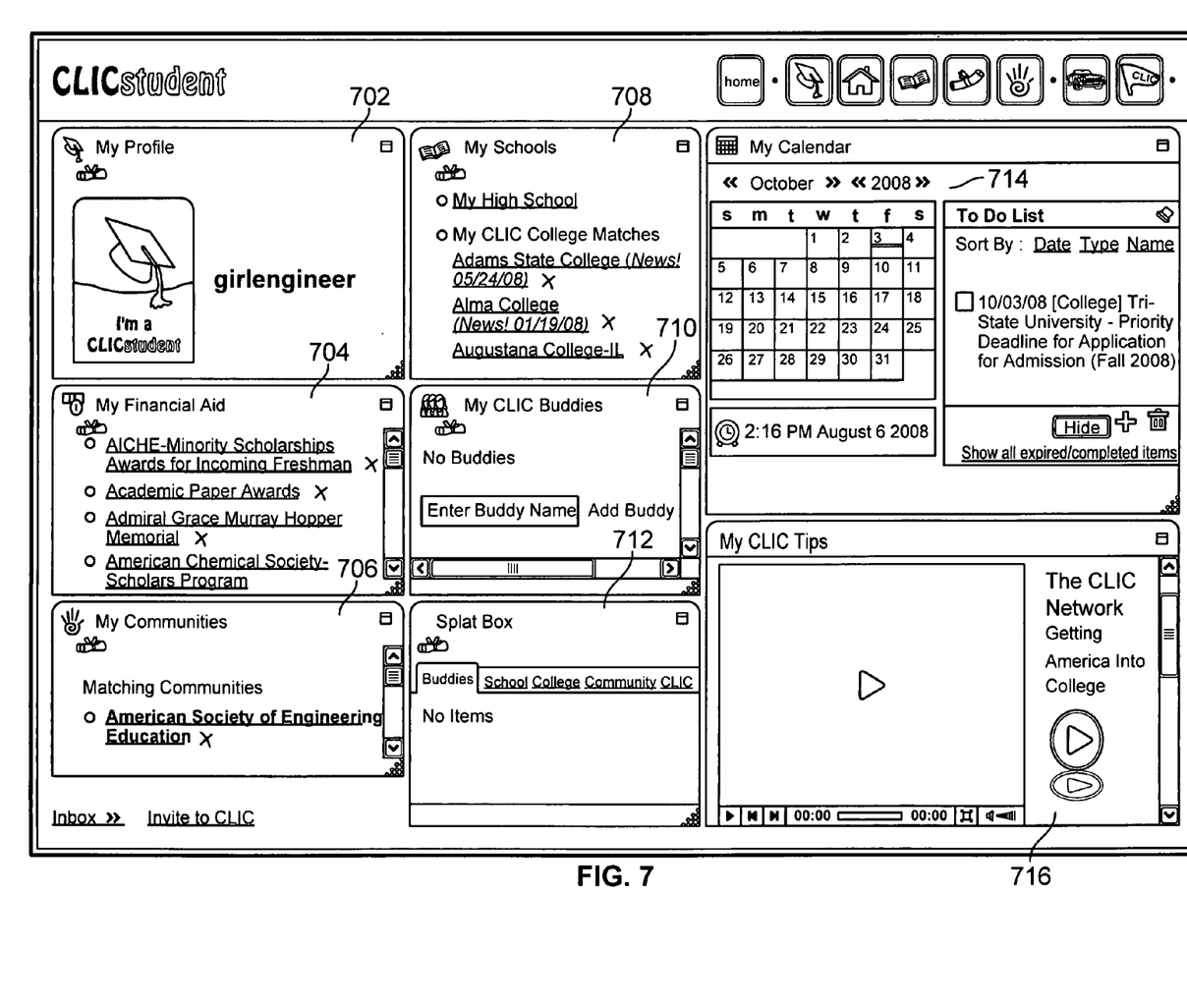
FIG. 7 illustrates an embodiment of an interface to a matching system.

FIG. 7 illustrates an embodiment of an interface to a matching system. The example shown is an implementation of a portion of website 114 as rendered in a browser. A student is logged into site 114 with the username "girlengineer." The student is currently viewing her homepage, which includes several different widgets. By selecting region 702, girlengineer can view and edit her profile information. In some embodiments selecting region 702 takes girlengineer to a new page, such as the interface shown in FIG. 5. As described in more detail below, in some embodiments selecting region 702 causes the My Profile widget to expand within the existing page.

Widget 704 provides information on financial aid offers for which girlengineer is a passive match, as determined, for example, using the process shown in FIG. 2. Girlengineer can learn more about the scholarships by clicking on their respective links, or can remove them from the widget by clicking the "X" appearing after the appropriate link.

Widget 706 provides information on community groups for which girlengineer is a passive match, as determined, for example, using the process shown in FIG. 2. Girlengineer can learn more about the organizations by clicking on their respective links, or can remove them from the widget by clicking the "X" appearing after the appropriate link.

Widget 708 provides information on schools for which girlengineer is a passive match, as determined, for example, using the process shown in FIG. 2. Girlengineer can learn more about the schools by clicking on their respective links, or can remove them from the widget by clicking the "X"

appearing after the appropriate link. In some embodiments, flags, tags, or other markers are included with entries, such as the schools listed in widget 708, and/or the entries are grouped. For example, the schools listed in widget 708 may be grouped according to whether they are "safe," (the student easily qualifies for admittance) "sensible," (the student is likely to qualify for admittance), and "dream" (the student will have some difficulty gaining admittance but is nonetheless encouraged to apply).

Widget 710 allows girlengineer to specify other students as buddies by entering their userids in the appropriate box. In various embodiments, students may only add as buddies other students from their schools, or vetted individuals such as a school counselor or family member. Students may share information with their buddies through what may be predefined messages, such as "check out ACME University" or "have you heard of the American Society of Engineering Education?"

Widget 712 is an inbox to which "splats" or messages are delivered. For example, if it is determined that girlengineer is a match with the ACME Tech recruiting event, an alert will appear in widget 712 (in addition to other actions being taken, such as the alert being sent to her phone and being included in her calendar).

Widget 714 includes a graphical calendar and a to-do list. In some embodiments, by default, all events associated with the groups appearing in widgets 704-708 are represented in widget 714. As she completes an item, such as the one shown in region 714, girlengineer can check the item off as having been completed. Items can also be hidden and deleted by selecting the appropriate buttons in region 714. She also can add her own original items to the calendar.

In addition to receiving information based on passive and active matches, girlengineer can also perform searches (e.g., for schools or financial aid offerings). If any of the results interest her, she can manually add them to appear in widgets 704-708 and any events associated with those manually added schools/groups/etc. will also appear in calendar widget 714. In addition, updates to those providers' page will generate a visual alert on her home page that new content appears on those pages.

Widget 716 provides girlengineer with multimedia information, such as tips hosted by system 102, or videos associated with the entities shown in widgets 704-708.

Figure 8:
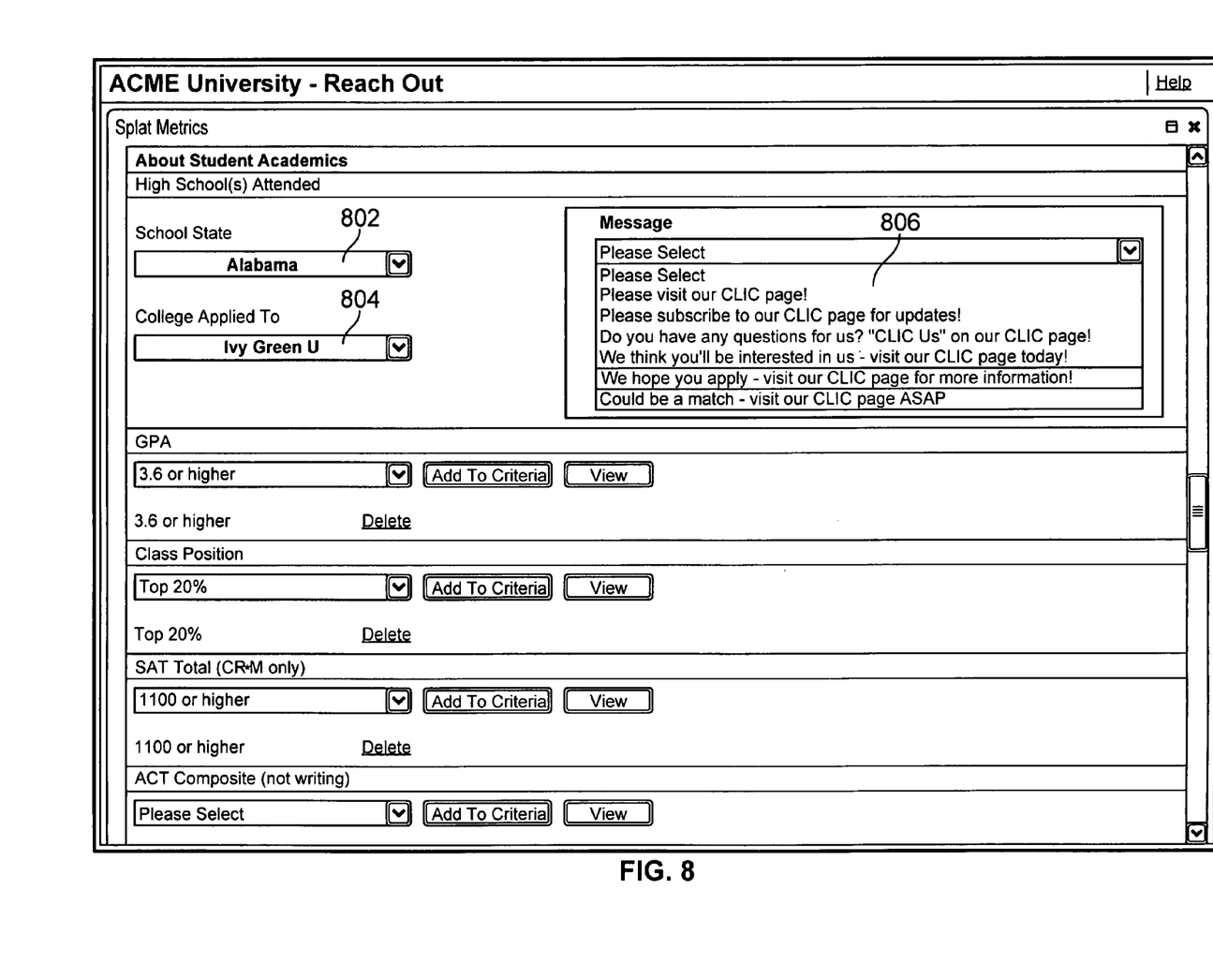
FIG. 8 illustrates an embodiment of an interface to a preference system.

FIG. 8 illustrates an embodiment of an interface to a preference system. The example shown is an implementation of a portion of website 114 as rendered in a browser. Suppose a recruiter at ACME University has been tasked with making sure that Alabama students who have applied to a prestigious school (Ivy Green U), have also applied to ACME University as a fall-back option. One concern of ACME's is that some students might mistakenly believe that their academic credentials are good enough to be accepted into Ivy Green U and therefore will not apply to a school with more relaxed admission requirements. To reach out to such students, the recruiter selects a "reach out" button on website 114. An interface is presented to the recruiter into which the recruiter can specify the attributes or other criteria associated with the type of student the university is trying to recruit. As described in more detail below, after defining the criteria, the recruiter can specify the action to be taken if appropriate students are located.

Using the interface shown in FIG. 4, the recruiter can specify that he is targeting students from Alabama (802) and that he is looking for students who have already applied to Ivy Green U (804), an attribute that becomes known to system 102, for example, when a student indicates in widget 714 that she has completed the application for Ivy Green U. In some embodiments system 102 is configured to facilitate online applications for providers, such by allowing students to complete electronic college applications and submit them to the appropriate school through page 116. In such a case, knowledge that a student has applied to a particular school can be captured as part of the process and stored in the student's profile automatically. Additional preferences can also be specified, such as by indicating a preference for students that speak multiple languages, students that are interested in studying math, students from single parent homes, etc.

In various embodiments, information such as whether a student has already submitted an application to a school, the residence state of the student, and other criteria can be used to limit the amount of access that student has to a provider. For example, small, but nationally-known colleges may receive a great deal of interest from students, the vast majority of whom are not qualified to attend the college. The small college makes available a "chat with a counselor" widget only to students who have already submitted applications, only those students with certain GPAs, etc., while allowing other students access to basic information such as deadlines. Similarly, community groups may limit some of their resources to students who reside in the appropriate community, who have a specified learning disability, etc. As another example, in the case of secondary schools, guidance counselors may limit access to their information to students currently enrolled in that secondary school.

In the example shown in FIG. 8, the recruiter is limited to sending a predefined message from a list of messages and is not able to send arbitrary free text messages (which may, for example, be available for a premium/fee). This is accomplished by selecting one of the messages in region 806 prior to submitting the match request.

Figure 9:
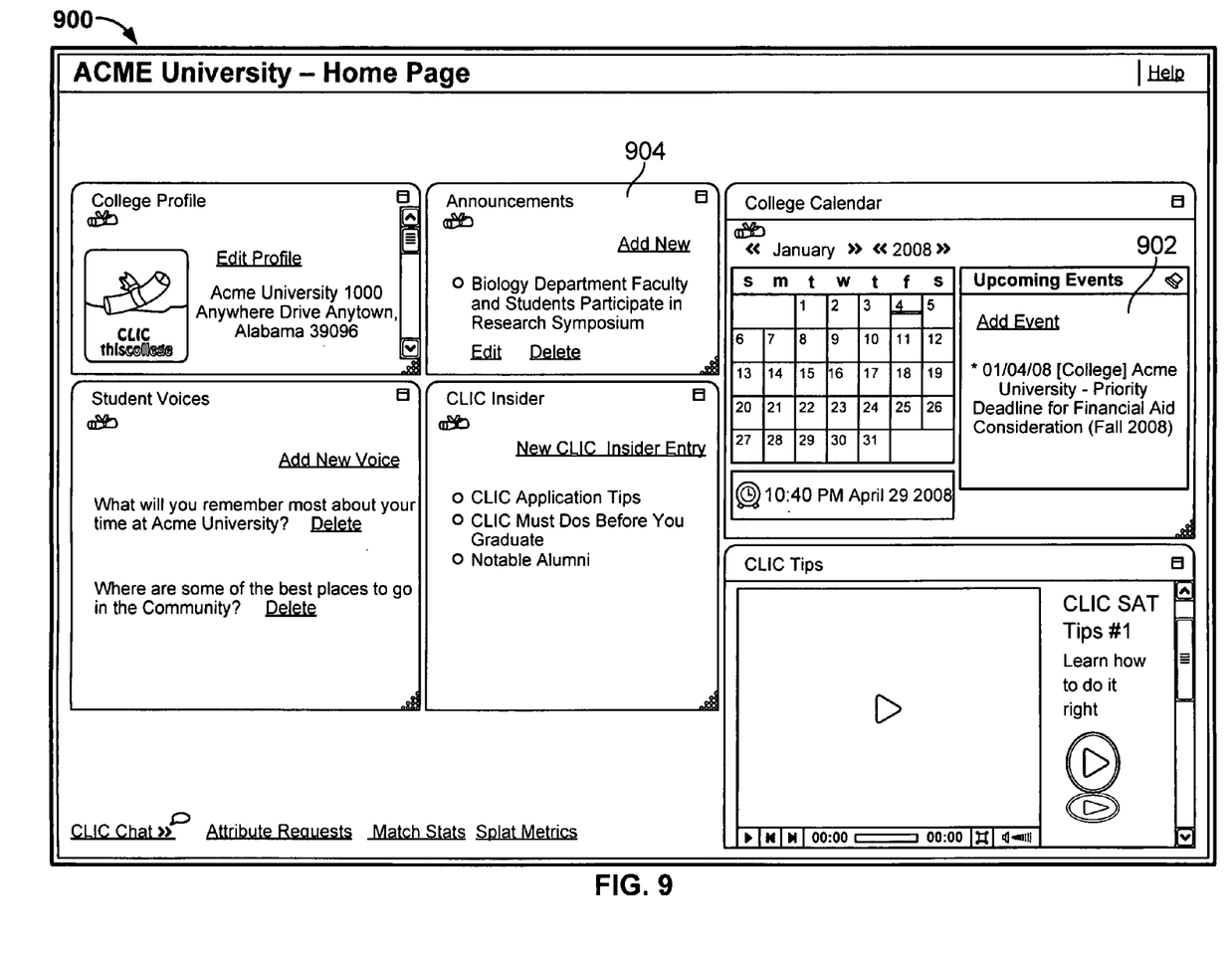
FIG. 9 illustrates an embodiment of an interface to a matching system.

FIG. 9 illustrates an embodiment of an interface to a matching system. The example shown is an implementation of a portion of website 114 as rendered in a browser. An ACME University administrator is logged into site 114. The administrator is currently viewing the ACME University homepage, as hosted by system 102, which includes several different widgets. The administrator can add new events to the calendar by selecting "Add Event" in region 902. As a result, a new entry will be made in the global calendar stored in database 112, and the event will also appear in the calendar widgets (e.g., 714) of students as applicable. The administrator can also add new news items by selecting the "Add New" link in region 904, and the news item will appear in the splat box (e.g., 712) of students as applicable. In some embodiments the events/news items/other information included in interface is updated by a third party, or by the administrator of system 102, instead of or in addition to an administrator at the university.

Figure 10:
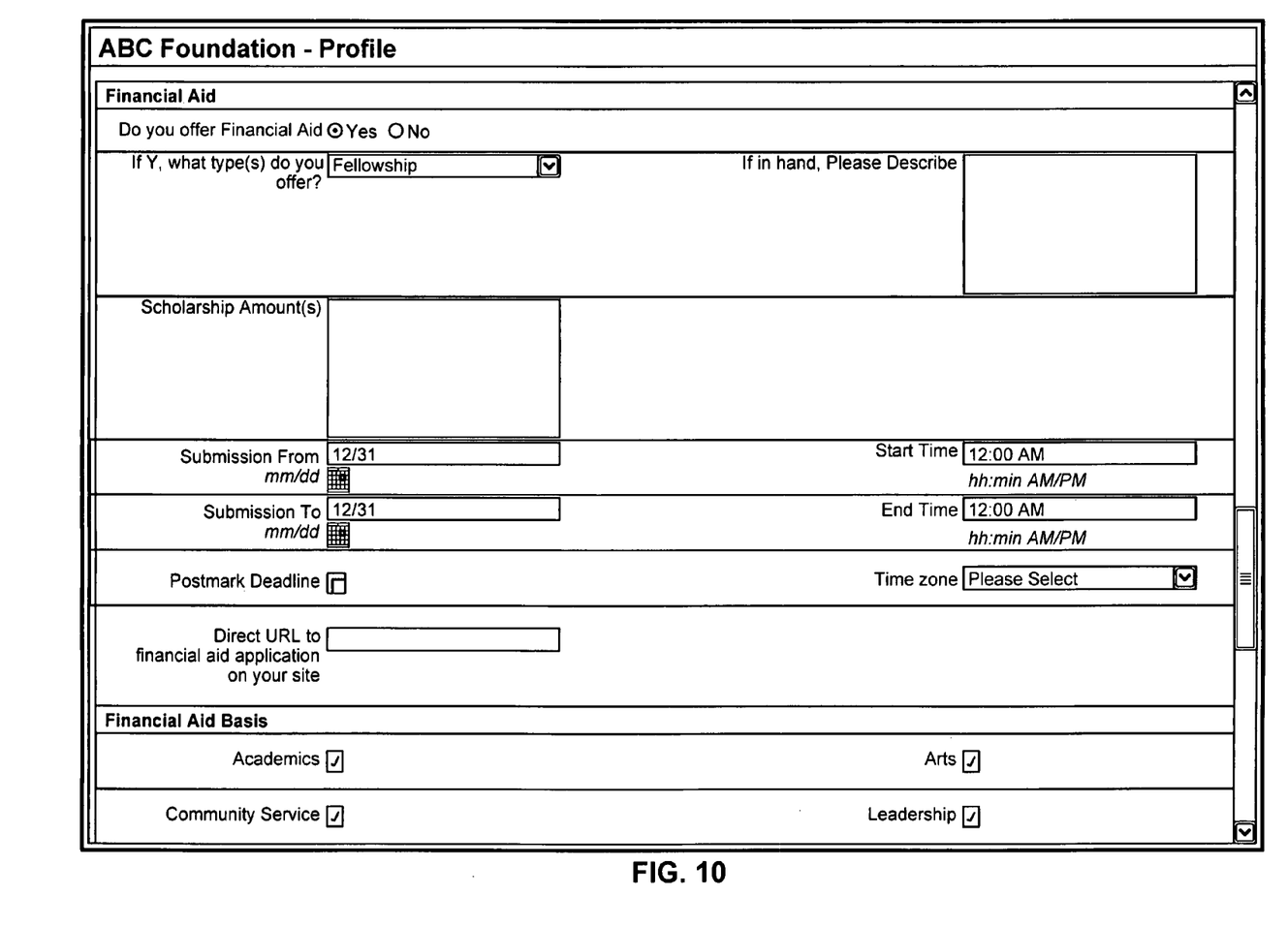
FIG. 10 illustrates an embodiment of an interface to a matching system.

FIG. 10 illustrates an embodiment of an interface to a matching system. The example shown is an implementation of a portion of website 114 as rendered in a browser. A representative of a community group is logged into site 114. As with universities, other providers can provide profile information and specify criteria that describe the types of students that they seek. In the example shown, a representative of the "ABC Foundation" is providing information on a fellowship that it offers. The requirements of the fellowship are specified in the interface shown in FIG. 10. Suppose one requirement of the fellowship is that one of the student's parents must be a current or former employee of the DEF Corporation. In some embodiments students who otherwise match the requirements of the fellowship are sent notices alerting them to the existence of the fellowship and asking them to supply additional information (i.e., whether their parents have ever worked for DEF Corporation), such as via splat box 712.

Universities and other providers can also describe the scholarships they offer using an interface such as the one shown in FIG. 10.

Widget Maximization and Minimization

In some embodiments website 114 is widget-based, with all necessary information visible at a glance within each defined widget. Further, any widget can be auto-maximized with one-click to display a full-page version in order to see and interact with more information without the user having to leave the page. The widget then can be auto-minimized with one click to instantly restore it to the original minimized size and position on the page.

Figure 11A:
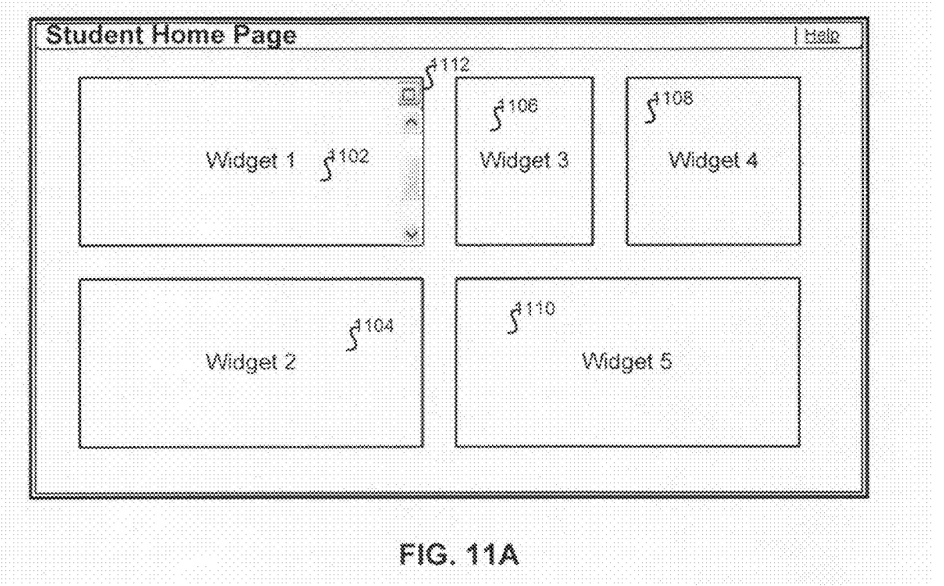
FIG. 11A illustrates an embodiment of an interface.

FIG. 11A illustrates an embodiment of an interface. Included in the interface are several widgets (1102-1110).

Figure 11B:
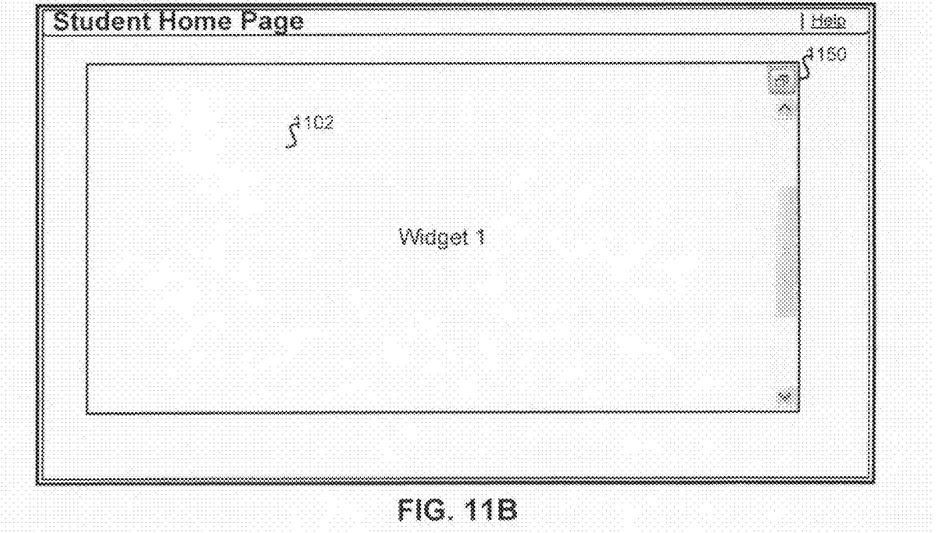
FIG. 11B illustrates an embodiment of an interface.

FIG. 11B illustrates an embodiment of an interface. In the example shown, a user has selected region 1112 of the widget shown in FIG. 11A. Instead of opening a new page, widget 1102 expands, covering the other widgets shown in FIG. 11A. If the user subsequently selects region 1150, widget 1102 will return to the size and position it occupies in FIG. 11A and the remaining widgets will be visible again.

In some embodiments a widget is created using a combination of DHTML and Javascript. Each widget is defined by attributes such as size (width and height), toggle buttons (minimize, maximize, close, restore), background color, and title image bar.

At the time of instantiation of any widget, certain parameters are passed to the widget constructor to customize the display of the widget such as the size of the widget, theme to use, unique identifier name, title bar image to use, along with the source content which will populate each widget. Each widget is instantiated to a separate object. These instantiations are carried out by the inclusion of the *_main.js or *_admin.js by the calling pages.

For the key toggles on top of each widget instantiated (e.g., the maximize, close, minimize and restore buttons), the dhtmlwidget.js code carries an event handler to deal with each of those events (unique defined by the clicking of each of those button types). Clicking each of those buttons calls a separate function inside dhtmlwidget.js. Thus, clicking on the maximize calls the maximize function for the widget object, minimize calls the minimize function in the object, and so on.

By having the key functionality of maximize, minimize and close isolated to individual functions, these functions can be accessed from any arbitrary javascript embedded inside pages so long as the widget created and the routine wanting to call the functions are within the same context. For example, when a user clicks on a "View/Edit My Profile" link on page 116, a javascript function showFullscreen is called. The showFullscreen effectively calls the maximize function of the profile widget object to simulate a widget maximize. The maximize function is able to record the past dimensions (such as size and position) of the widget prior to proceeding with the maximization. This enables the previous dimensions to be restored if the user ever chooses to restore back to the regular/standard dimensions of the widget (via clicking the restore icon) prior to the maximize.

Auto-minimize works in a very similar fashion as the auto-maximize described above. Specifically, any buttons, toggles or links that warrant an auto-minimize simulate a minimize or restoration back to the widget's original dimensions by calling the respective restore or minimize javascript functions inside the widget object. These dimensions would be fetched from the cached arrays/variables carrying the stored parameters of the widget from the time of instantiation.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for displaying information, comprising:
providing, within a single display interface, a plurality of widgets, wherein at least one widget in the plurality of widgets includes at least one toggle button, and associating the at least one widget in the plurality of widgets with a first set of predetermined dimensions and performing a single function or plurality of functions;
receiving, through an interaction with the toggle button, a widget auto-resizing request;
providing a second set of predetermined dimensions; and
responsive to the widget auto-resizing request, using computer program instructions to cause the at least one widget to automatically display in an area defined by the second set of predetermined dimensions within the existing display interface up to 100% of the provided display and within the single display interface as a single human interface function, and, after displaying to the area defined by the second set of predetermined dimensions, to retain full performance of the single function or plurality of functions demonstrated in the first set of predetermined dimensions by returning to a size and position it occupied in the first set of predetermined dimensions while retaining full performance of the single function or plurality of functions demonstrated in the second set of predetermined dimensions, thereby presenting the widget in the second set of predetermined dimensions within the single display interface with the plurality of widgets obstructed only by the change in display of the widget in the area defined by the second set of predetermined dimensions without leaving the single display interface or opening a new display interface, and allowing the user to interact with the content of the widget in both the first and second set of predetermined dimensions and allowing the user to return the widget to the size and position it occupied in the first set of predetermined dimensions by executing a single human interface function, thereby presenting the user interface with the remaining widget's visible again,
wherein the at least one widget allows users full interactivity of the at least one widget within the single display interface in the first set of predetermined dimensions and the second set of predetermined dimensions.

2. A system for displaying information, comprising:
a processor configured to:
provide, within a single display interface, a plurality of widgets, wherein at least one widget in the plurality of widgets includes at least one toggle button and wherein the at least one widget in the plurality of widgets is associated with a first set of predetermined dimensions and performs a single function or plurality of functions;
receive, through an interaction with the toggle button, a widget auto-resizing request;
determine a second set of predetermined dimensions; and
responsive to the auto-widget resizing request, use computer program instructions to cause the at least one widget to automatically display in an area defined by the second set of predetermined dimensions within the existing display interface up to 100% of the provided display and within the single display interface as a single human interface function, and, after displaying to the area defined by the second set of predetermined dimensions, to retain full performance of the single function or plurality of functions demonstrated in the first set of predetermined dimensions by returning to a size and position it occupied in the first set of predetermined dimensions while retaining full performance of the single function or plurality of functions demonstrated in the second set of predetermined dimensions, thereby presenting the widget in the second set of predetermined dimensions within the single display interface with the plurality of widgets obstructed only by the change in display of the widget in the area defined by the second set of predetermined dimensions without leaving the single display interface or opening a new display interface, and allowing the user to interact with the content of the widget in both the first and second set of predetermined dimensions and allowing the user to return the widget to the size and position it occupied in the first set of predetermined dimensions by executing a single human interface function, thereby presenting the user interface with the remaining widgets visible again, wherein the at least one widget allows users full interactivity of the at least one widget within the single display interface in the first set of predetermined dimensions and the second set of predetermined dimensions; and a memory coupled to the processor and configured to provide the processor with instructions.

3. A computer program product for displaying information, the computer program product being embodied in a computer readable non-transitory storage medium and comprising computer instructions for:

providing, within a single display interface, a plurality of widgets, wherein at least one widget in the plurality of widgets includes at least one toggle button and associating the at least one widget in the plurality of widgets with a first set of predetermined dimensions and performing a single function or plurality of functions;

receiving, through an interaction with the toggle button, an auto-maximize request;

receiving a second set of predetermined dimensions; and causing computer program instructions to cause the at least one widget to automatically display in an area defined by the second set of predetermined dimensions within the existing display interface up to 100% of the provided display and within the single display interface as a single human interface function, and, after displaying to the area defined by the second set of predetermined dimensions, to retain full performance of the single function or plurality of functions demonstrated in the first set of predetermined dimensions by returning to a size and position it occupied in the first set of predetermined dimensions while retaining full performance of the single function or plurality of functions demonstrated in the second set of predetermined dimensions, thereby presenting the widget in the second set of predetermined dimensions within the single display interface with the plurality of widgets obstructed only by the change in display of the widget in the area defined by the second set of predetermined dimensions without leaving the single display interface or opening a new display interface, and allowing the user to interact with the content of the widget in both the first and second set of predetermined dimensions and allowing the user to return the widget to the size and position it occupied in the first set of predetermined dimensions by executing a single human interface function, thereby presenting the user interface with the remaining widgets visible again, wherein the at least one widget allows users full interactivity of the at least one widget within the single display interface in the first set of predetermined dimensions and the second set of predetermined-dimensions.

4. The method of claim 1, wherein the widget auto-resizing request is an auto-maximize request and the second set of predetermined dimensions is equal to the dimensions of the single display interface, such that only the maximized widget is viewable of the plurality of widgets.

5. The method of claim 1, wherein the widget auto-resizing request is an auto-minimize request and the second set of predetermined dimensions is smaller than the first set of predetermined dimensions and smaller than the dimensions of the single display interface.

6. The method of claim 5, wherein responsive to the auto-minimize request, the at least one widget is displayed in a manner such that the plurality of widgets are simultaneously viewable.

7. The method of claim 1, wherein the widget auto-resizing request is customizable by inputting a set of values for the second set of predetermined dimensions.

8. The method of claim 1, wherein the plurality of widgets have a common theme and related content.

9. The method of claim 1, wherein the plurality of widgets are fully functional and scrollable, regardless of dimension.

10. The method of claim 1, wherein the position of any of the plurality of widgets can be changed through selecting from the group consisting of: maximize, minimize, and restore.

11. The method of claim 1, wherein the content of any of the plurality of widgets is customizable by a user and are hideable or deleteable by selecting human interface function within the widget to be customized within the single display interface.

12. The method of claim 1, wherein updates to any of the plurality of widgets generates an alert and new content is displayed on at least one of the widgets.

13. The method of claim 1, wherein the human interface function comprises a mouse click.

14. The method of claim 1, wherein the human interface function comprises functional interactivity with a screen element.

15. The system for displaying information according to claim 2, wherein the human interface function comprises a mouse click.

16. The system for displaying information according to claim 2, wherein the human interface function comprises functional interactivity with a screen element.

17. The computer program product of claim 3, wherein the human interface function comprises a mouse click.

18. The computer program product of claim 3, wherein the human interface function comprises functional interactivity with a screen element.

* * * * *

UNITED STATES PATENT AND TRADEMARK OFFICE
CERTIFICATE OF CORRECTION

| | | |
|---|---|---|
| PATENT NO. | : 8,910,067 B1 | Page 1 of 1 |
| APPLICATION NO. | : 12/228422 | |
| DATED | : December 9, 2014 | |
| INVENTOR(S) | : Donna Michelle Anderson | |

It is certified that error appears in the above-identified patent and that said Letters Patent is hereby corrected as shown below:

In the Claims

Claim 1, Column 10, Line 46: remove "widget's" and replace with "widgets"

Signed and Sealed this
Fourteenth Day of April, 2015

Michelle K. Lee
*Director of the United States Patent and Trademark Office*